US007016359B2

(12) United States Patent
Naim et al.

(10) Patent No.: US 7,016,359 B2
(45) Date of Patent: Mar. 21, 2006

(54) METHOD FOR PROVIDING HYBRID VOICE AND PACKET DATA SERVICES TO A MOBILE STATION

(75) Inventors: Ghassan Naim, Garland, TX (US); Vijay Hiremath, Dallas, TX (US); Pardeep Kohli, Plano, TX (US); Arvind Betrabet, Murphy, TX (US); Seshagiri R. Madhavapeddy, Richardson, TX (US)

(73) Assignee: Alcatel Wireless, Inc., Plano, TX (US)

( * ) Notice: Subject to any disclaimer, the term of this patent is extended or adjusted under 35 U.S.C. 154(b) by 960 days.

(21) Appl. No.: 09/934,987

(22) Filed: Aug. 22, 2001

(65) Prior Publication Data

US 2003/0206551 A1  Nov. 6, 2003

(51) Int. Cl.
*H04L 12/56* (2006.01)
(52) U.S. Cl. .................................... 370/401; 455/414.1
(58) Field of Classification Search ................ 370/401, 370/352–356; 455/414.1, 416, 417, 413, 455/445
See application file for complete search history.

(56) References Cited

U.S. PATENT DOCUMENTS

| 5,809,415 | A | 9/1998 | Rossmann |
| 6,018,520 | A | 1/2000 | Okada |
| 6,144,667 | A | 11/2000 | Doshi et al. |
| 6,154,646 | A * | 11/2000 | Tran et al. .................. 455/417 |
| 6,230,005 | B1 | 5/2001 | Le et al. |
| 2002/0191590 | A1 * | 12/2002 | Niu et al. .................. 370/352 |
| 2003/0165135 | A1 * | 9/2003 | Itzkovitz et al. ............ 370/352 |

* cited by examiner

*Primary Examiner*—Chi Pham
*Assistant Examiner*—Blanche Wong
(74) *Attorney, Agent, or Firm*—Haynes & Boone, LLP; Bobby D. Slaton; V. Lawrence Sewell

(57) ABSTRACT

A method and system is provided to allow wireless systems to support many new voice and data services. An example of a service provided is the ability to switch a requested voice call into a packet data call and vise versa without the interaction of the user.

13 Claims, 10 Drawing Sheets

METHOD FOR PROVIDING HYBRID VOICE AND PACKET DATA SERVICES TO A MOBILE STATION

BACKGROUND OF THE INVENTION

The present invention relates generally to data telecommunications, and more particularly, to a system and method for hybrid voice and packet data for providing services to a wireless mobile user.

In communications networks, a user often requires many types of services during the same session. In particular, in a wireless network, a mobile user may require packet data and voice services at the same time. A good example is a concierge service where a mobile user may require information such as maps, a list of restaurants or any other services in the area from a live concierge service representative without being released from its voice connection with the representative. Another example is a complex communication application during which a user may require downloading data files and presentations without getting disconnected from the voice application.

According to the latest specifications of 2.5G and 3G mobile wireless standards, only mobile stations (MS) that belong to Class-A can handle simultaneous data and voice services. Class-B MSs, on the other hand, are limited to operating one service type at a time. However, the majority of MSs that exist in the market today are Class-B because Class-A MSs are hard to maintain and expensive to operate. Additionally, the limitations of Class-B MSs are significant, for example, there is no support for "Real-time Call Forwarding" service in the MS. This service allows the mobile user to instantaneously forward an incoming call to another person instead of accepting it. This can be found extremely useful between family members and friends and is important in business relations where an important call is forwarded to another person when the called person is engaged in an activity that cannot be interrupted.

Additionally, in communication networks, certain situations can often develop where a user may initiate voice or packet data calls without knowing whether the called party can accept the call or not. Another situation may arise when the MS needs to make a voice call to trigger a packet data session or vise versa.

What is needed is a versatile method or system that can change the call connection from one type to another without the interaction from the MS.

SUMMARY OF THE INVENTION

Accordingly, the present invention provides a system and method to provide new services to a mobile user that otherwise cannot be provided by current wireless system specifications.

The present invention also provides a method to change the service type requested by the mobile station without the mobile user interaction before the call is setup.

The present invention further provides a method to provide new services to a mobile user without changing the specifications for current wireless systems.

The present invention further still provides a system for controlling the incoming calls to a mobile station.

The present invention also provides a method for controlling the operation of other network nodes that play a part in the provision of different services to a mobile station.

The present invention still further provides a method for handling and maintaining calls with the user-end other than the mobile station.

The present invention is applicable to any mobile unit compliant with the 2.5G, 3G and future generations of wireless system specifications.

The present invention is applicable to any radio technology type that could be used by the mobile station on the air interface.

The present invention provides the ability to switch a requested voice call into a packet data call and vise versa without the interaction of a user-end client (i.e. the system operation will be transparent to the mobile user). Additionally, the present invention allows wireless systems to support many new services that cannot be provided by the current systems.

Moreover, the present invention offers certain flexibility to the network that allows it to change a requested service type (originated by the mobile station or the network) for the sake of providing a more efficient service to the end-user. One example is accessing a "web page" by dialing a telephone number: a mobile dialing 1-800-CNN-WWEB will automatically download the web page www.cnn.com on the terminal end equipment of the mobile. Another service example is "Hot Call Handling" which provides a mobile user several methods for dealing with an incoming call such as forwarding it to another person instead of accepting it. Other services include routing the mobile user call to a live customer representative after accessing a non-functional automated service center. Still other services could replace current Interactive Voice Response (IVR) menus with interactive text menus.

Therefore, in accordance with the previous summary, objects, features, and advantages of the present invention will become apparent to one skilled in the art from the subsequent description and the appended claims taken in conjunction with the accompanying drawings.

DESCRIPTION OF THE PREFERRED EMBODIMENT

The present invention can be described with several examples given below. It is understood, however, that the examples below are not necessarily limitations to the present invention, but are used to describe typical embodiments of operation.

Although a Wireless Switch (WS) is used as an example to describe the invention, the invention can apply to any telecommunication network node that has similar functions. Additionally, although a mobile station is used as an example to describe the invention, the invention can apply to any wireless device that may require similar types of services.

Figure 1:
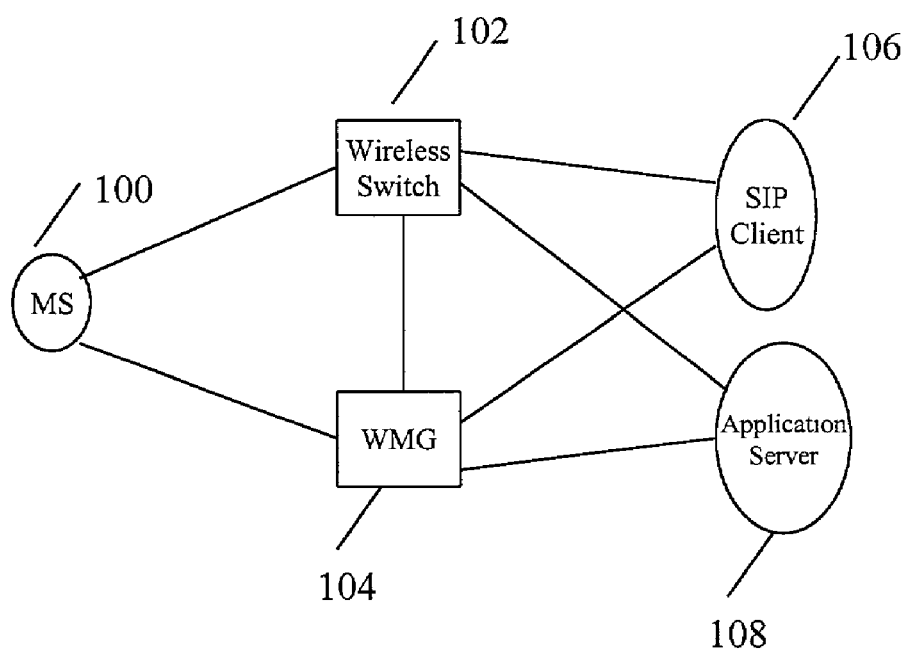
FIG. 1 illustrates a high level wireless network architecture presenting the elements used in the present invention.

Now referring to FIG. 1, a mobile station 100 is connected to a wireless switch 102 and a Wireless Media Gateway (WMG) 104. The WMG 104 is responsible for transferring application data information between the MS 100 and a SIP (Session Initiation Protocol) Client 106 and between the MS 100 and an Application Server 108. Although, the SIP Client 106 is used as an example, the present invention contemplates replacing the SIP Client caller with any other type of caller such as a PSTN (Public Switch Telephone Network) node or even another mobile station. Additionally, although the Application Server 108 is used as a separate network entity, the patent can apply to cases where the Application Server 108 is part of the WMG 104.

The Wireless Switch 102 controls the WMG 104 using control messages. Additionally, the Application Server 108 provides application services for end-users. Yet, there maybe other nodes that exist in a real network but are not shown in the figure for the sake of simplicity.

Each connection between the entities allows transfer of information using a specific set of protocols. However, the details of these generally known standard protocols and rules used are not shown in the present invention for simplicity purposes.

The call status and other information are kept at the Wireless Switch 102. The MS 100 or SIP Client 106 submits any new call requests or modifications to the Wireless Switch 102. The Wireless Switch 102 also handles the calls and exchanges call information with the MS 100, the SIP Client 106, the WMG 104, and the Application Server 108.

Moreover, the architecture of the present invention includes a network portion and the radio portion. Generally, the network portion refers to the interfaces between the Wireless Switch, the WMG, the Application Server and the SIP Client. Conversely, the radio portion generally refers to the interfaces between the MS and the Wireless Switch, and the MS and WMG. These interfaces exist to allow communication between the various network elements. Additionally, well defined communication protocols are used to communicate between each entity and its neighbor. Furthermore, the present embodiment is implemented as a software module in the Wireless Switch and WMG nodes. Accordingly, the WS is sometimes described hereafter as a Wireless Soft Switch.

Figure 2:
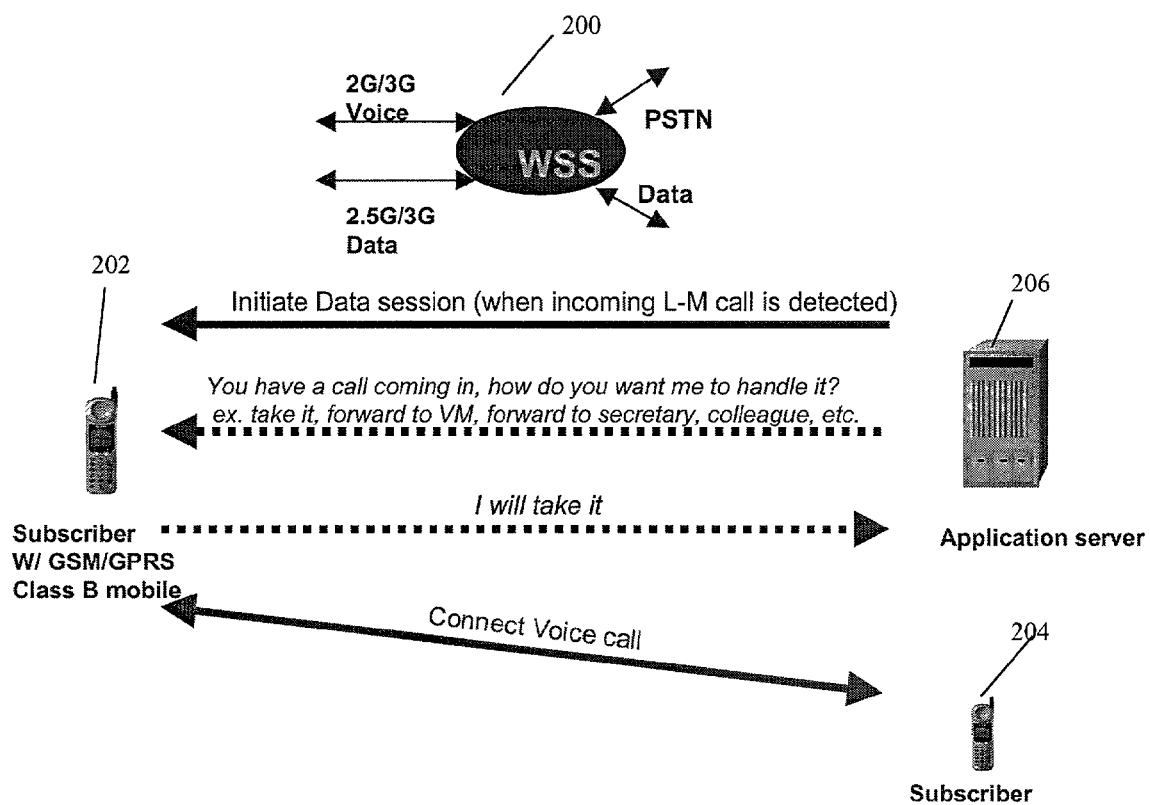
FIG. 2 illustrates the concept of Hot Call Handling service with an example where the user decides to accept the incoming call.

A conceptual representation of Hot Call Handling is shown in FIG. 2. A Wireless Soft Switch (WSS) 200 is depicted and can handle wireless calls for 2G, 2.5G, and 3G compliant mobile phones 202 and 204. The WSS 200 also has a SIP interface to the network. SIP is a session initiation protocol used to handle signaling messages that control the calls between two IP (Internet Protocol) based network entities. However, the SIP protocol details are not described herein since it is a generally known standard protocol.

One example of a Hot Call Handling Service is when a user requests to forward the call to another mobile. However, other types of service are also available by the present invention. Some of the services include:

World Wide Web access by dialing a telephone number;
Automatically getting connected to a live customer representative upon accessing a malfunctioning packet data server; and
Replacing IVR service long selection process by an interactive text menu display on the mobile display screen.

The Hot Call Handling service provides the mobile user a choice menu to decide how to handle the incoming call. The menu in this embodiment includes the following action items:

Accept and Answer the call;
Send the Call to Voicemail;
Forward the call to another number; and
Transfer the call to another location.

However, call elements such as "Caller ID" and other call related information are also contemplated by the present invention.

FIG. 2 illustrates an example of Hot Call Handling where the mobile decides to accept the incoming call. The voice call gets detected by the WSS 200 which initiates a data session from the application to the callee 202. Once the data session is established, the application server 206 informs the callee 202 (through the WMG, not shown) that a call is coming in and sends the callee 202 a menu (through the WMG, not shown) to choose from on how to handle the call. In this example, the callee 202 selects to take the call and then the call is connected from the caller 204 to the callee 202 (through the WMG, not shown).

Referring again to FIG. 1, the mobile cellular user and the caller are represented by MS 100 and SIP Client 106, respectively. Note that, in this embodiment, an end-to-end connection has to be established before any information can be transferred to a user-end point. Therefore, in this example, the SIP Client 106 first sends a request message to the Wireless Switch 102 requesting a Voice connection with the MS 100. The SIP Client 106 must then wait for confirmation from the WS 102 before the communication can start between the MS 100 and the SIP Client 106.

Figure 3:
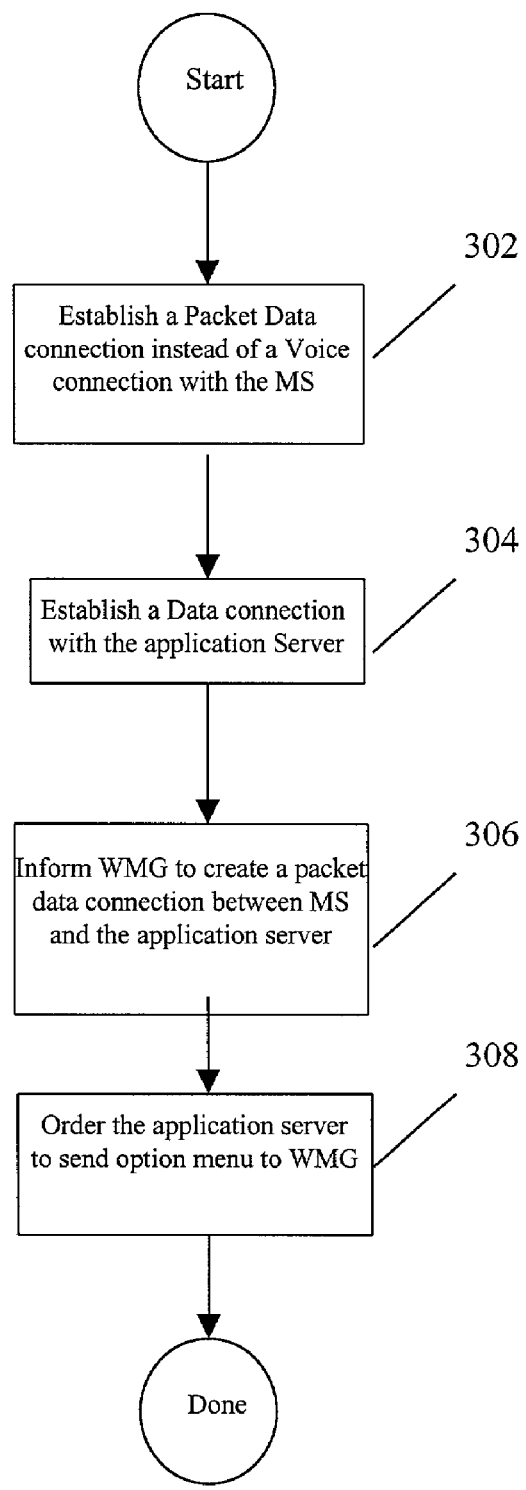
FIG. 3 illustrates a flow chart of steps at a Wireless Switch when an incoming voice call is received from the network.

Referring now to FIG. 3, upon receiving a voice call from the SIP Client, the WS will change the call type from voice to packet data by establishing a Packet Data connection with the MS instead of a voice connection as requested by the SIP Client as depicted by step 302. At the same time, the WS establishes a data connection with the Application Server and informs the WMG to create a packet data connection between the MS and the Application Server as illustrated in steps 304 and 306. Once this is established, the WS commands the Application Server to start the transfer of the Option Menu to the MS through the WMG as illustrated in step 308.

Figure 4:
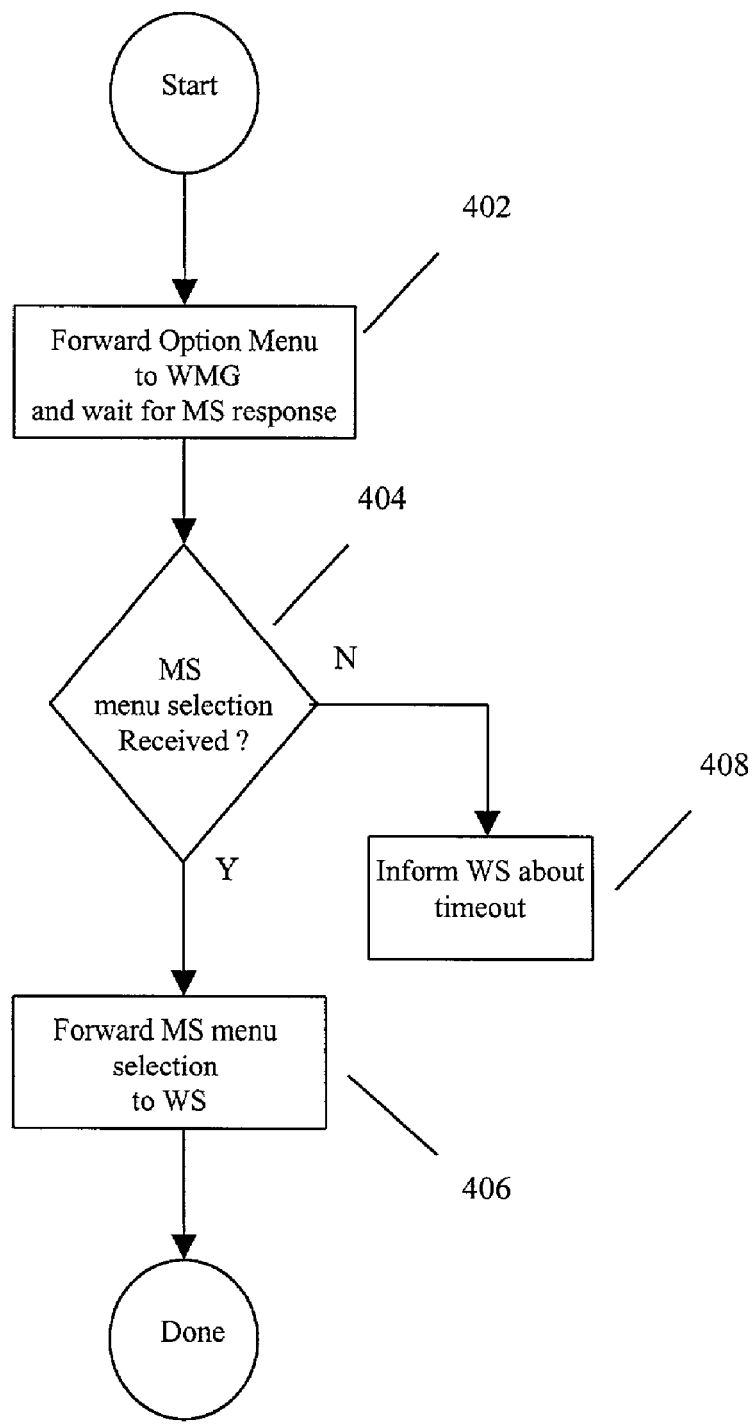
FIG. 4 illustrates a flow chart of steps at the Application Server when a command is received from WS to download the Option menu to the mobile.

Referring now to FIG. 4, upon receiving the command from the WS, the application server sends the option menu data to the WMG which then forwards it to the MS as illustrated in step 402. The application server then waits for the MS response with the menu selection as illustrated in step 404. Once the menu selection is received, the application server forwards it to the WS as illustrated in step 406.

If no response is received from the MS after a predefined time has elapsed, the application server informs the WS about the timeout event. In that case, the WS follows the process illustrated in FIG. 5 where it deactivates the connection with the MS and the application server, and informs the WMG to cancel the link between the MS and the application server as illustrated in steps 502, 504, and 506. The WS then forwards the call from the SIP client to the MS voice mail as illustrated in step 508.

In this example however, "Call Forwarding" is selected from the MS menu and contains the number of the new MS to be called. Although the new called party could be any device that has a telephone number, a mobile station is used in this example.

Figure 6:
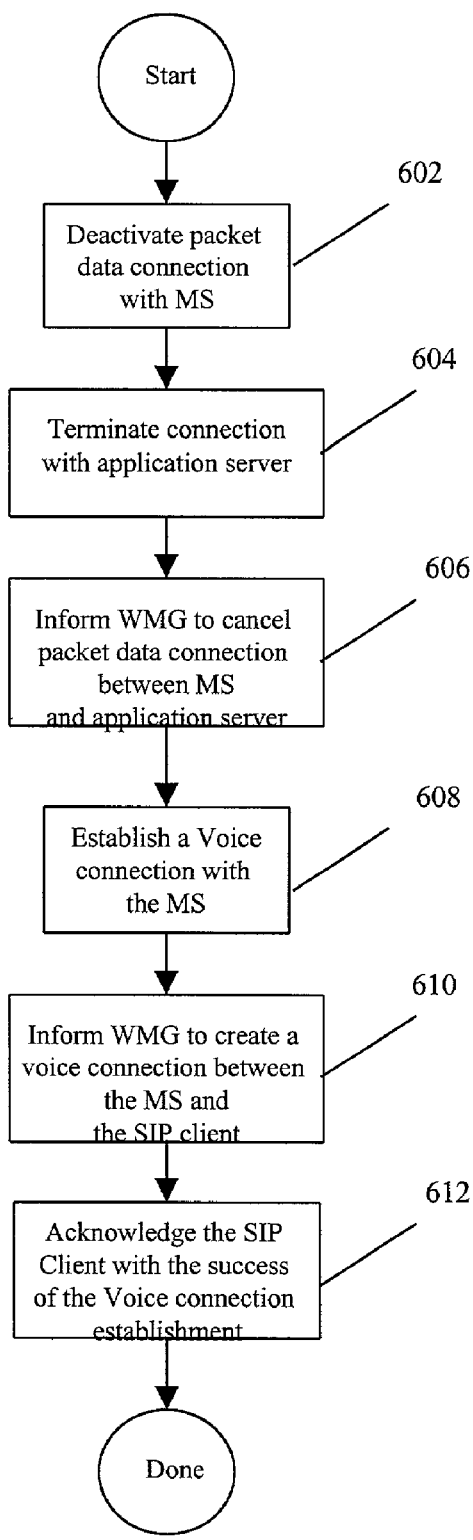
FIG. 6 illustrates a flow chart of steps at the Wireless Switch when the MS menu selection is to forward the network incoming call.

Referring now to FIG. 6, upon receiving the MS response from the Application Server, the WS first deactivates the packet data connection with the new MS and the Application Server, and informs the WMG to cancel the packet data connection as illustrated in steps 602, 604, and 606. The WS then establishes a voice connection with the new MS, informs the WMG of the new connection, and informs the SIP Client caller of the success in establishing a voice connection as depicted in steps 608, 610, and 612. Now a voice connection is established between the SIP Client and the new MS.

Figure 5:
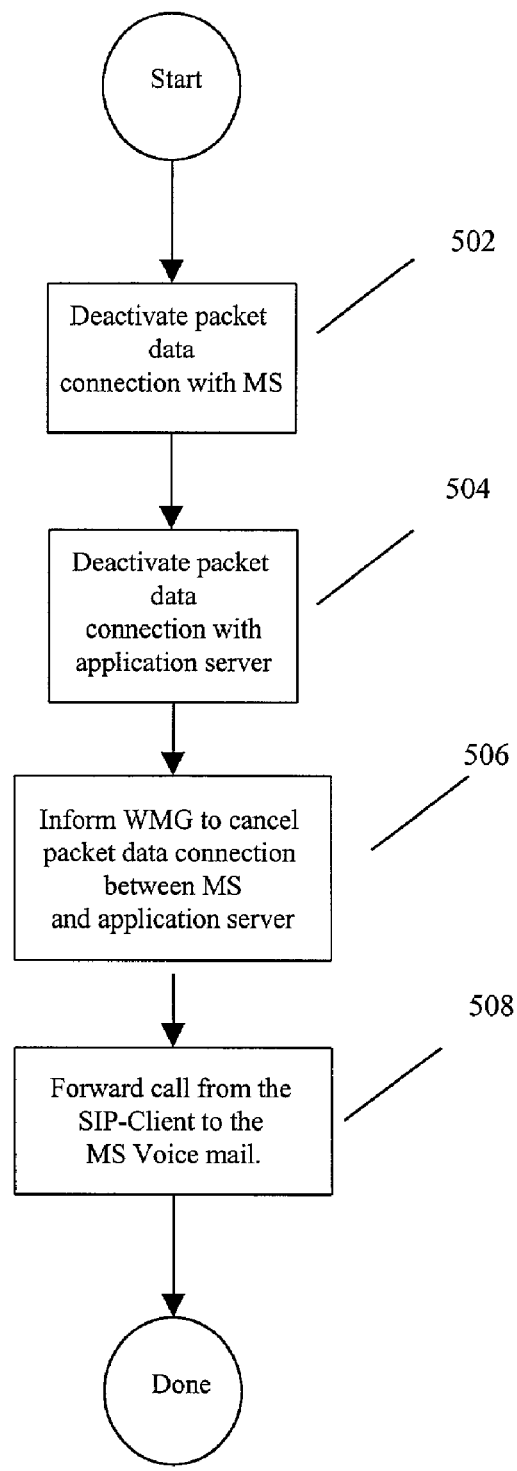
FIG. 5 illustrates a flow chart of steps at the Wireless Switch when the MS menu selection is to accept a network incoming call.
Figure 7:
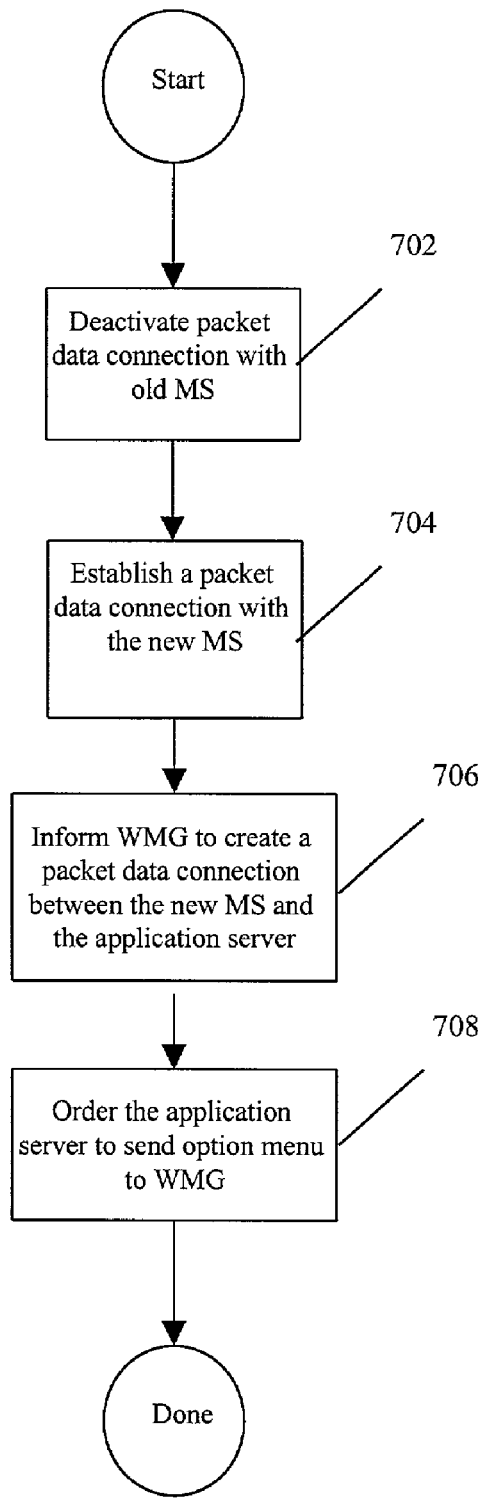
FIG. 7 illustrates a flow chart of steps at the Wireless Switch when receiving a MS menu selection timeout from the application server.

Note that it is also possible to give the new mobile station an option menu to decide how to deal with the call as illustrated in FIG. 7. Additionally, the menu content could be customized by the Application Server to accommodate different customer needs. For example, in this embodiment, "Call Forwarding" would not be listed in the new menu since the call has already been forwarded once. This scenario is covered in FIG. 7 where first the WS deactivates the packet data connection with the old MS and then establishes a packet data connection with the new MS as depicted in steps 702 and 704. The WS also informs the WMG to link the packet data connection from the Application Server to the new MS as depicted in step 706. Once the new MS's packet data connection with the application server is established, the WS instructs the Application Server to send the Option menu to the new MS as depicted in step 708. Thereafter, the same process in FIGS. 4, 5, and 6 is repeated with the new MS.

Figure 8:
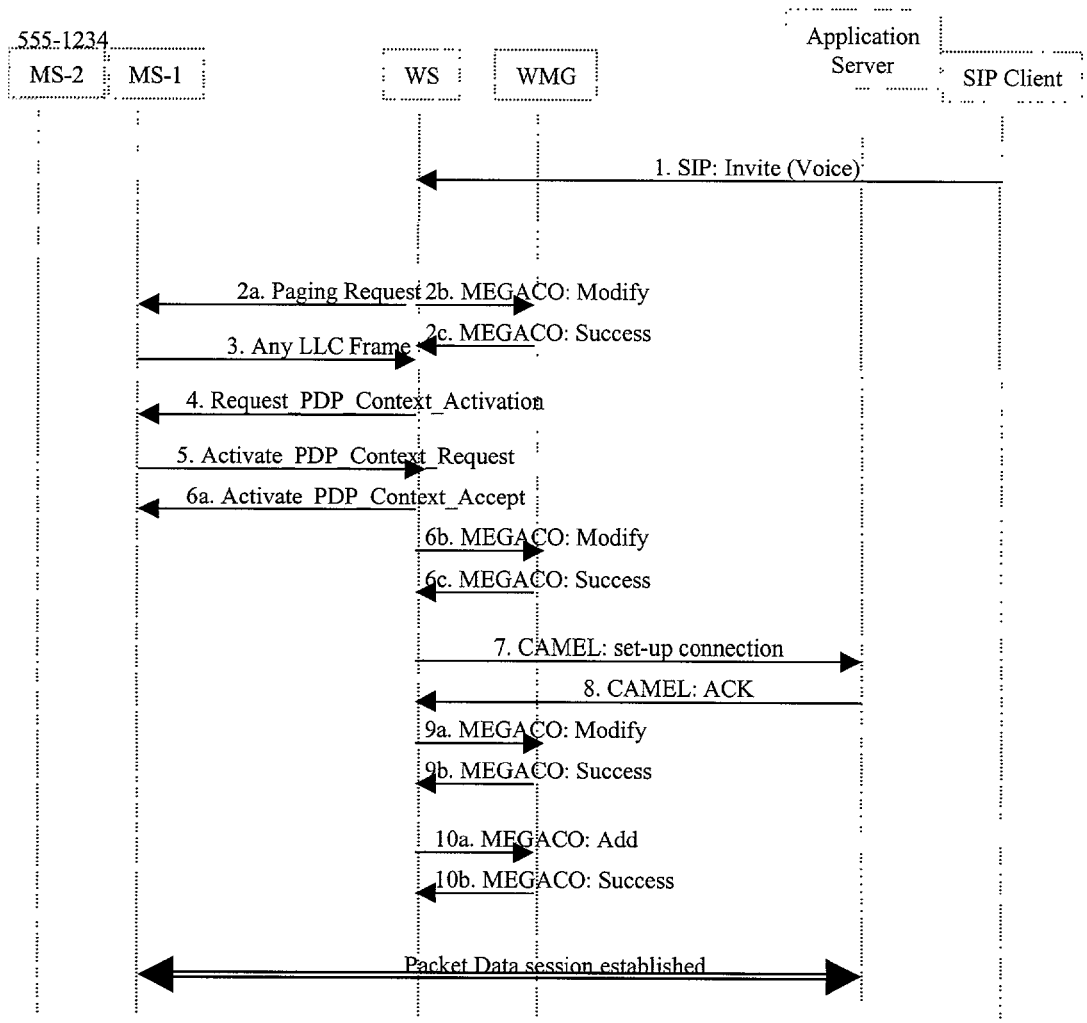
FIGS. 8, 9, and 10 illustrate call flow details for the Hot Call Handling service with the call forwarding feature.
Figure 9:
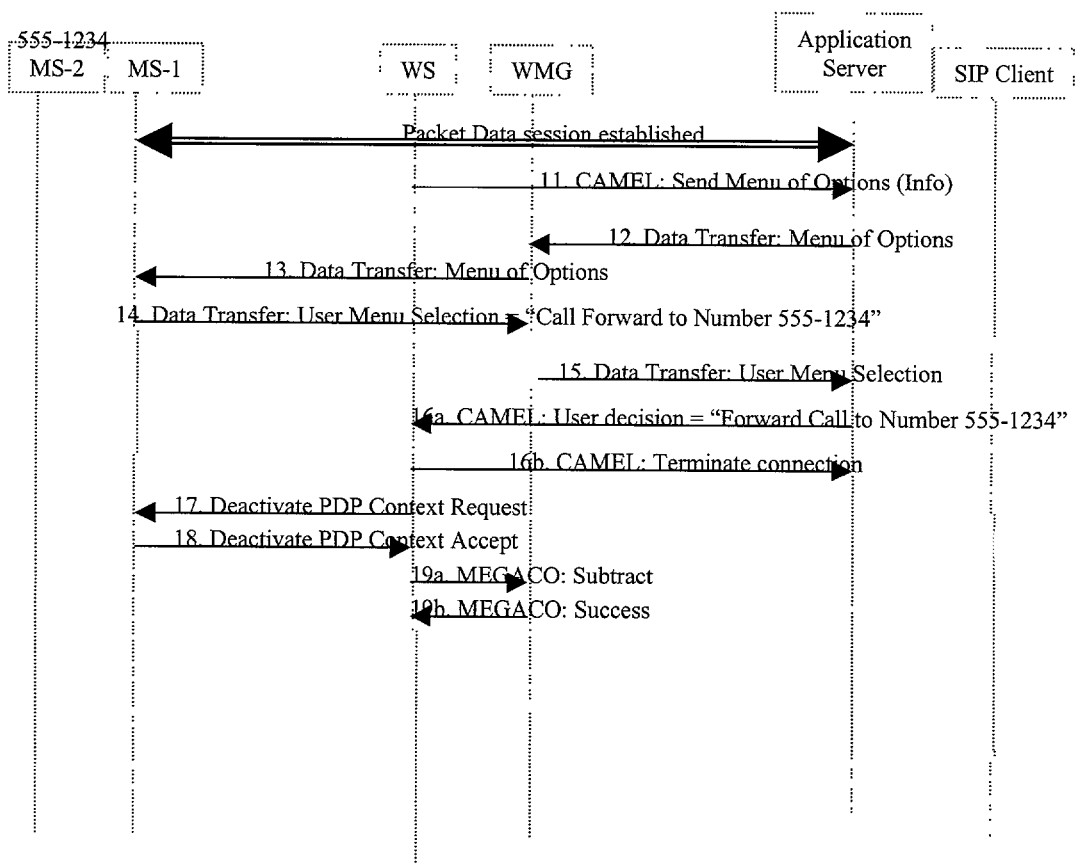
Figure 10:
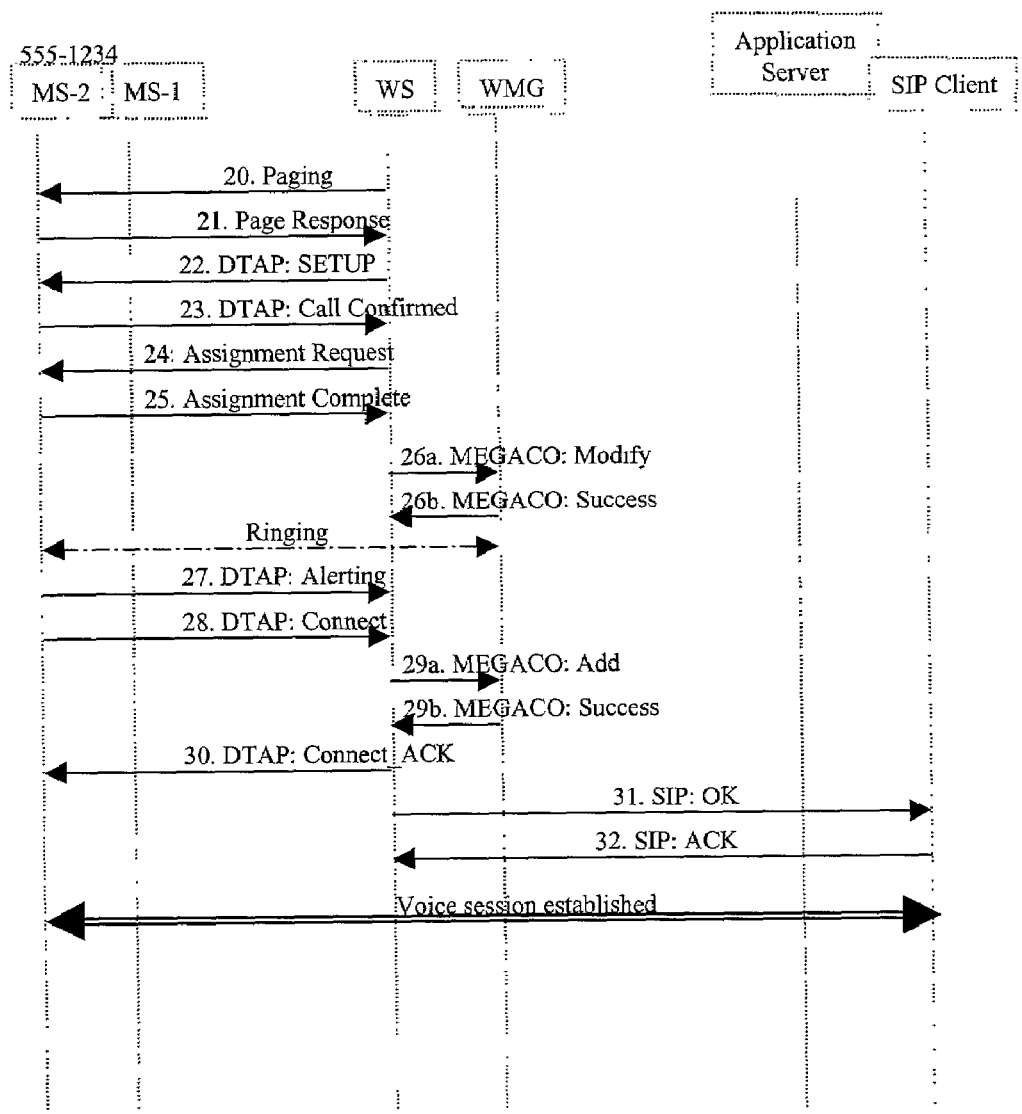

Referring now to FIGS. 8, 9, and 10, detailed call flow charts are presented. In these figures, MS-1 is the called party, and MS-2 is the mobile user to which the call is forwarded. All messages between the MS and the WS are defined in the 2.5G and 3G wireless standards. The other messages use other protocols well known in the telecommunication industry such as SIP, TCP/IP, MEGACO (Media Gateway Control protocol), CAMEL (Customized Application of Mobile Enhanced Logic), and DTAP (Direct Access Transfer Protocol). Again, since these protocols are well known in the industry, details are not described herein.

Specifically, in FIG. 8, as indicated by step 1, the SIP client 800 sends a SIP:Invite(voice) to the WS 806. The WS 806 finds the necessary information to late MS-1 808 using the information in the SIP:Invite message and other sources such as HLR (a network entity that maintains and provides MS location and property services to other network entities such as WS) or other mapping procedures located on the web.

In step 2a, the WS 806 sends a Paging Request to the MS-1 808.

In step 2b, the WS 806 sends a MEGACO: Modify message to the WMG 804. WMG 804 creates a context for a remote (SIP Client 800 in this case) termination for the voice session.

In step 2c the WMG 804 send a MEGACO: Success message to the WS 806.

In step 3, the MS-1 808 sends Any LLC Frame to the WS 806.

In step 4, the WS 806 sends a Request PDP Context Activation to the MS-1 808.

In step 5, the MS-1 808 send an Activate PDP Contest Request to the WS 806.

In step 6a, the WS 806 sends an Activate PDP Context Accept to the MS-1 808. Upon the request from WS 806, the WMG 804 can play a temporary voice announcement or music to the calling client while waiting for the call to be setup with the appropriate MS.

In step 6b, the WS 806 sends a MEGACO: Modify message to the WMG 804. The WMG 804 creates a context for a local (MS-1 808 in this case) termination for the data session.

In step 6c, the WMG 804 sends a MEGACO: Success message to the WS 806.

In step 7, the WS 806 sends a CAMEL: set-up connection the Application Server 802.

In step 8, the Application Server 802 sends a CAMEL: ACK message to the WS 806.

In step 9a, the WS 806 sends a MEGACO: Modify message to the WMG 804. The WMG 804 creates a context for a remote (Application Server 802) termination for the data session.

In step 9b, the WMG 804 sends a MEGACO: Success message to the WS 806.

In step 10a, the WS 806 sends a MEGACO: Add message to the WMG 804.

In step 10b, the WMG 804 sends a MEGACO: success message to the WS 806.

In step 11, the WS 806 sends a CAMEL: Send Menu of Options (Info) to the Application Server 802.

In step 12, the Application Server 802 sends a Data Transfer: Menu of Options to the WMG 804.

In step 13, the WMG 804 sends a Data Transfer: Menu of Options to the MS-1 808.

In step 14, the MS-1 808 sends a Data Transfer: User Menu Selection="Call Forward to Number 555-1234" to the WMG 804.

In step 15, the WMG 804 sends Data Transfer: User Menu Selection to the Application Server 802.

In step 16a, the Application Server 802 sends a CAMEL: User decision "Forward Call to Number 555-1234" to the WS 806.

In step 16b, the WS 806 sends a CAMEL: Terminate connection to the Application Server 802.

In step 17, the WS 806 sends a Deactivate PDP Context Request to the MS-1 808.

In step 18, the MS-1 808 sends a Deactivate PDP Context Accept to the WS 806.

In step 19a, the WS 806 sends a MEGACO: Subtract message to the WMG 804. The WMG 804 deletes context for local (MS-1 808) and remote (Application Server 802) terminations for the data session.

In step 19b, the WMG 804 sends a MEGACO: Success message to the WS 806.

In step 20, the WS 806 sends a Paging Request to the MS-2 810.

In step 21, the MS-2 810 sends a Page Response to the WS 806.

In step 22, the WS 806 sends a DTAP: SETUP message to the MS-2 810.

In step 23, the MS-2 810 sends a DTAP: Call Confirmed message to the WS 806.

In step 24, the WS 806 sends an Assignment Request to the MS-2 810.

In step 25, the MS-2 810 sends an Assignment Complete to the WS 806.

In step 26a, the WS 806 sends a MEGACO: Modify message to the WMG 804. The WMG 804 creates a context for a local (MS-2 810) termination for the voice session.

In step 26b, the WMG 804 sends a MEGACO: Success message to the WS 806.

In step 27, the MS-2 810 sends a DTAP: Alterting message the WS 806.

In step 28, the MS-2 810 sends a DTAP: Connect message to the WS 806.

In step 29a, the WS 806 sends a MEGACO: Add message to the WMG 804. The WMG 804 connects local and remote termination to create a voice connection between the SIP Client 800 and the MS-2 810.

In step 29b, the WMG 804 sends a MEGACO: Success message to the WS 806.

In step 30, the WS 806 sends a DTAP: Connect ACK message to the MS-2 810.

In step 31, the WS 806 sends a SIP: OK message to the SIP Client 800.

In step 32, the SIP Client 800 sends a SIP: ACK message to the WS 806.

The present invention as described above thus provides a revolutionary method for providing new services in wireless networks compliant to the 2.5G and 3G wireless specifications. Consequently, various benefits are achieved over existing solutions. For instance, the present invention provides the mobile user with more options for handling incoming calls. Another example includes a user accessing Internet web pages without knowing the complete (and often long and difficult to remember) Internet Protocol (IP) or Universal Resource Locator (URL) address. In this example, the user would just simply use a phone number for the URL address. Yet another example includes a user accessing an automated system service much faster by using a text menu instead of using an IVR. In addition, another example includes automatically routing a user to an alternate source of services when the called service center is malfunctioning.

It will also be understood by those having skill in the art that one or more (including all) of the elements/steps of the present invention may be implemented using software executed on a general purpose computer system or networked computer systems, using special purpose hardware-based computer systems, or using combinations of special purpose, and general purpose, hardware and software.

The above disclosure provides many different embodiments, or examples, for implementing the invention. However, specific examples, and processes are described to help clarify the invention. These are, of course, merely examples and are not intended to limit the invention from that described in the claims. Furthermore, while the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for providing hybrid communication services including voice and data, in a communications network with a wireless switch, a wireless media gateway and an application server, the method comprising:

initiating a call from a caller to a callee through the wireless switch;

initiating a data session to the callee from the application server connected to the wireless switch;

sending a plurality of options in a menu format to the callee from the application server through the wireless media gateway;

selecting at least one option by the callee;

transmitting the at least one option to the application server through the wireless media gateway;

deactivating the data session from the application server to the callee; and performing the at least one option.

2. The method of claim 1 wherein the at least one option is connecting the caller to voicemail.

3. The method of claim 1 wherein the at least one option is forwarding the caller to a mobile user.

4. The method of claim 1 wherein the callee is an interactive response unit at a call center.

5. The method of claim 1 wherein the callee is a first call center and the first call center forwards the caller to a second call center when the first call center is malfunctioning.

6. The method of claim 1 further including deactivating the data session from the application server after the at least one option is transmitted.

7. The method of claim 6 further including establishing a voice connection between the caller and the callee.

8. The method of claim 1 further including sending the mobile user the plurality of options from the application server.

9. A system for providing a hybrid communication consisting of voice and data, in a communications network, the method comprising:

a caller which initiates a call;

a wireless switch connected to the caller;

an application server initiating a data session to a callee to send a plurality of options to the callee, wherein the callee is an interactive response unit at a call center;

a means for selecting at least one option;

a means for transmitting the at least one option to the application server; and a means for performing the at least one option.

10. The system of claim 9 wherein the at least one option is connecting the caller to voicemail.

11. The system of claim 9 wherein the at least one option is forwarding the caller to a mobile user.

12. The system of claim 9 wherein the callee is a first call center and the first call center forwards the caller to second call center when the first call center is malfunctioning.

13. A method for providing hybrid communication services including voice and data, in a communications network with a wireless switch, a wireless media gateway, a Session Initiation Protocol (SIP) client, and an application server, the method comprising:

initiating a call from a caller to a callee through the wireless switch and SIP client;

initiating a packet data session to the callee from the application server connected to the wireless switch and wireless media gateway;

sending a plurality of options in a menu format to the callee from the application server through the wireless media gateway;

selecting at least one option by the callee;

transmitting the at least one option to the application server through the wireless media gateway;

transmitting the at least one option to the wireless switch from the application server;

deactivating the data session from the wireless switch to the application server;

deactivating the data session from the wireless switch to the callee; and performing the at least one option.

* * * * *